United States Patent Office 3,091,472
Patented May 28, 1963

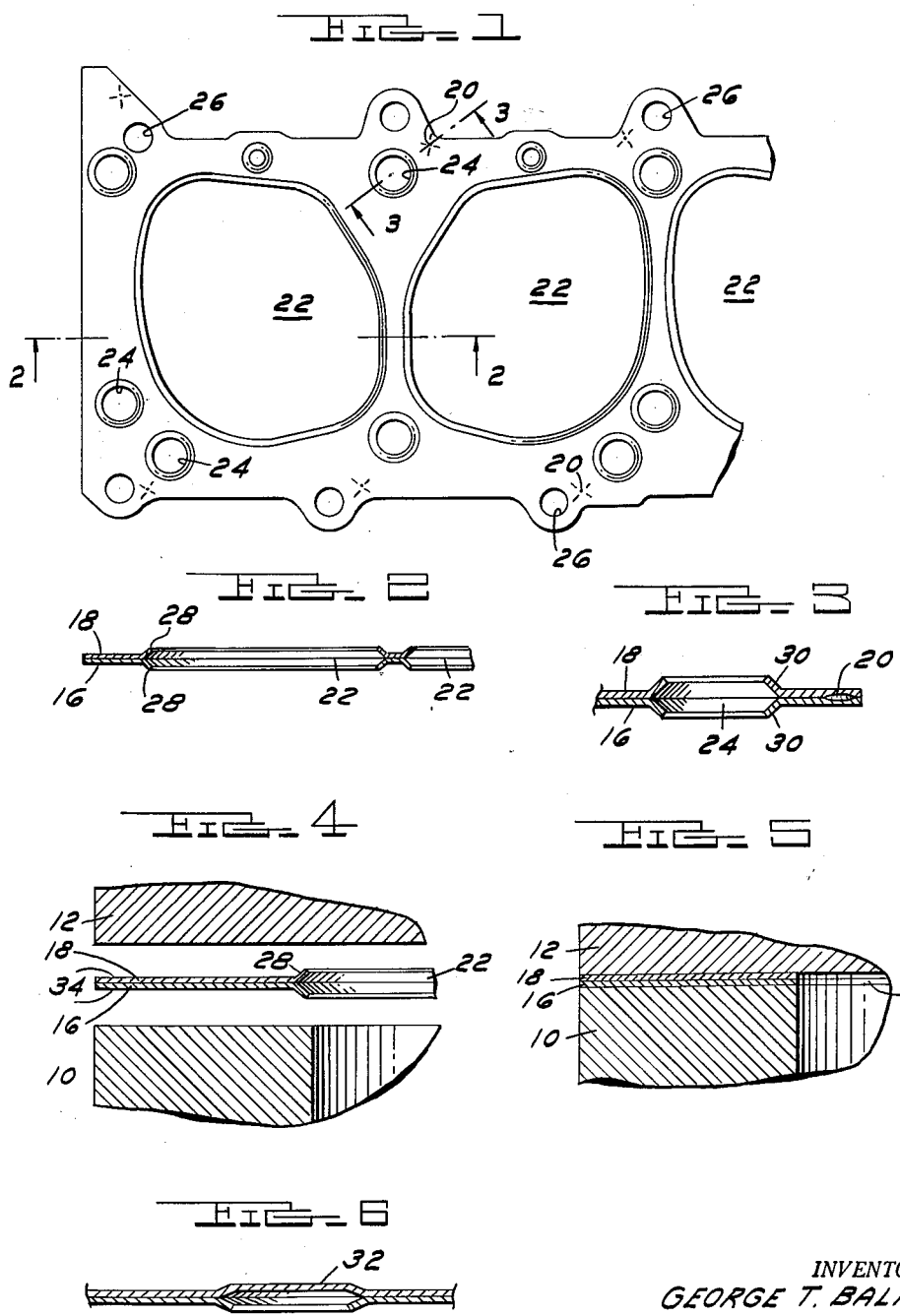

3,091,472
METAL GASKETS
George T. Balfe, Farmington, Mich., assignor to Detroit Gasket & Manufacturing Company, Detroit, Mich., a corporation of Michigan
Filed May 24, 1960, Ser. No. 33,075
2 Claims. (Cl. 277—206)

This invention relates to improvements in gaskets and particularly to such as are designed for use between a cylinder block and the head which is secured to such a block.

An object is to provide such a gasket which is inexpensive, which is relatively thin and presents a relatively small thickness of gasket material to the service opening sealed by the gasket, and which provides a peculiarly efficient and secure seal with both the cylinder block and the head thereof.

Another object is the provision of a gasket particularly designed for use with high compression automobile engines and wherein the bolt torque applied to the studs which are used to secure the head to the engine block is substantially higher than has heretofore been commonly employed.

Another object is to provide a gasket of the character set forth which is formed substantially throughout of sheet metal, and consists of two complementary relatively thin plies of suitable sheet metal such as steel or the like; and wherein each ply has a marginal flange surrounding each service opening and bent up out of the plane of the ply at an obtuse angle with respect to such plane. Such flanges project in opposite directions away from the plane of the gasket, and the margins of the flanges of each ply engage the adjacent face of the head or the block as the case may be.

Another object is the provision of a gasket of the character described, wherein the two complementary sheet metal plies are disposed back-to-back so that their complementary flanges which surround the service openings project in the form of outwardly opening V shapes extending away from the combined planar thickness of the two plies and toward the service openings. The margins of the flanges of one ply are adapted to form a secure contact seal against the adjacent surface of the cylinder block. The margins of the flanges of the other ply are adapted to form a secure contact seal against the adjacent surface of the head, which is mounted upon the block.

An important feature is that the two complementary flanges surrounding each service opening and disposed back-to-back are resistingly resilient so that when the head is tightened down upon the block these flanges are flattened out and each brought substantially within the planar thickness of its ply in back-to-back engagement with its cooperating flange between the head and the block.

A meritorious feature is that the two-ply gasket provides substantially planar engagement on opposite sides of the head and the bloc and forms a tight seal therewithin.

Another meritorious feature is that the two plies which make up the gasket are each coated upon both sides with a suitable resistant sealant plastic coating. This coating covers not only the outer exposed faces of the two plies but also the inner opposed contacting faces of the two plies and extends throughout the flange portions of the plies.

Another meritorious feature is that the two plies which make up the gasket are secured together by spot-welding or the like at points remote from the service openings and from the flanges that surround the service openings. A further meritorious feature is that the securement together of the plies is of such a character that each of the two plies is capable of responding substantially independently, and particularly throughout its marginal flange portions, to accommodate itself to the tightening down of the head upon the block or to accommodation in service between the block and the head without being unduly restrained by virtue of its securement to its complementary ply.

The above structure provides a very tight and secure seal against leakage of fluid under pressure. The marginal flanges about the service opening may be so flattened down against the entire surface of the block and the head that the gasket throughout its entire expanse serves to seal the joint between the head and the block.

Other objects, advantages, and meritorious features will more fully appear from the following description, claims, and accompanying drawing, wherein:

FIG. 1 is a plan of a fragment of a cylinder head gasket embodying the invention;

FIG. 2 is a cross-sectional view taken on the line 2—2 of FIG. 1;

FIG. 3 is a cross-sectional view taken on the line 3—3 of FIG. 1;

FIG. 4 is a fragmentary sectional view through a fragment of a cylinder block and the associated fragment of the head and the interposed fragment of the gasket with the component pieces being separated so that the gasket is not under pressure between the head and the block;

FIG. 5 is a view similar to that of FIG. 4 in that the same fragments of the same pieces are illustrated but the gasket fragment is shown as held under pressure between the head and the block and is shown as sealing the joint between the head and the block about a service opening; and FIG. 6 is a view taken on the same line as FIG. 3 but showing a modification in structure.

This application is a continuation in part of my application Serial No. 530,308, filed August 24, 1955, and now abandoned and represents an improvement upon my Patent No. 2,695,186, patented November 23, 1954.

The instant invention is shown as embodied in a cylinder head gasket for an internal combustion engine such as used in motor vehicles. In the drawing a fragment of the cylinder block is indicated as 10 and a fragment of the head is indicated as 12. The gasket is shown as comprising two complementary planar metal sheets or plies 16 and 18, formed and secured together as hereinafter described.

The two metal plies which make up the gasket may be sheet steel plies or any other suitable metallic sheet material which is desired for use. These two plies are smooth, thin, and heat-resisting. If sheet steel is used each ply may have such thickness as is deemed desirable. A thickness of .015" is suitable. The gasket is provided with the usual service openings, such as combustion chamber openings 22 and cooling fluid openings 24. There are also bolt or stud apertures 26. Stud bolts, not shown in the drawing, extend through the apertures 26 and are employed to secure the head 12 to the block 10 and to hold the gasket in place between the head and the block. This practice is conventional and well understood. Such stud bolts are tightened down until the gasket is brought under the desired pressure to accomplish a seal between the head and the cylinder block.

Each sheet metal ply has its margin immediately adjacent to a service opening bent out of the plane of the ply at an angle thereto as shown in FIGS. 2 and 3. In FIG. 2 such marginal flanges are indicated as 28. These marginal flanges are shown as surrounding a combustion chamber opening 22. In FIG. 3 similar marginal flanges 30 are shown as surrounding a cooling fluid opening 24.

These flanges are complementary. They are resiliently resistant to flattening but yield to do so. They extend in opposite directions away from the plane of the two-ply gasket.

They are so formed as to provide continuous smooth unwrinkled planar flange portions. The edge of one flange is adapted to bear against the cylinder block. The edge of the opposite flanges bears against the head portion. The beveled margins or vertices of the complementary flanges are disposed in back-to-back abutment. They reinforce each other and reinforce the resistance of each flange to flattening within the plane of its ply.

These two plies are secured together, as by spot-welding at 20, in such a manner that each ply is permitted a substantial amount of independent freedom of surface adjustment to accommodate itself to the adjacent surface of the head or the block as the case may be between which opposed surfaces it is received. It is desired that each ply be capable of responding to pressures imposed upon it as freely from restraint or strain or tension by the other ply to which it is secured as is consistent with providing a two-ply gasket as herein described.

It is particularly desirable that the two plies throughout their complementary flange areas and areas adjacent thereto be free from the spot welding hereinabove described which imposes a strain or tension and rigidity upon the plies at the points of welding. Such welding is shown as preferably adjacent to the perimeter of the gasket as for example in proximity to the bolt apertures thereto.

When the gasket is placed under pressure between the head and the block by tightening down of the studs urging the head down upon the block, the flanges 28 and 30 resistingly yield to be brought throughout their area substantially into back-to-back planar engagement as shown in FIG. 5. These flanges are flattened to the point that they jointly lie substantially within the plane of the two-ply gasket itself. The edges of the flanges, however, are at all times urged very strongly against the head and the block engaged by such edges and form a tight joint therewith.

The flanges are shown as normally bent out of the planes of the plies at angles other than a right angle. Such is illustrated as at an obtuse angle with respect to the plane of the body of the ply, note FIGS. 2, 3, and 4. The angle of the flange about the combustion chamber opening may be different from that of the flange about the water cooling opening if such is desired to increase resistance to flattening.

In certain cases it may be desired to have a gasket seal off a water passageway in the block or in the head and in such case one ply of the gasket is shown as unbroken opposite the aperture through the other ply but as being slightly deformed opposite such aperture as a complement to the flange about the aperture in the ply provided with the opening. Such construction is shown in FIG. 6 at 32. When a gasket provided with such a feature is employed, the bumped-out portion 32 is flattened down substantially within the plane of the ply provided with such bumped-out portion when the gasket is placed in use. It is flattened down in the same way that a flange is flattened down as hereinabove described.

It is preferred that each outer surface of the gasket be provided with a coating of heat-resisting compressible plastic material. Suitable thermo-setting resins are used for such purpose. One such coating material which has been found satisfactory is a thermo-setting urea alkyd resin composition being a mixture of a urea resin and an alkyd resin in suitable proportions to form a satisfactory heat-resisting compressible plastic coating. A modified epoxy varnish containing aluminum powder, such as is available on the market, has also been successfully used. Certain synthetic rubber compositions are also usable. Such coating is indicated at 34 in FIG. 4. The coating layer is provided in a thickness of approximately .001". Such coating compositions are resistant within the temperatures met to heat deterioration and are also resistant to deterioration upon contact with permanent anti-freeze solution contained within the cooling system, such as ethylene glycol.

The two sheet metal plies which make up the gasket structure are thin, smooth-surfaced plies and normally form a close, tight seal when secured together but it is preferred to interpose a thin layer of resin coating material such as above described between these two plies of sheet metal so as to provide a more complete and secure seal as was set forth hereinabove.

The opposed surfaces of the cylinder block and the head may exhibit fine machine marks as a result of their formation, which marks may have a depth of .001". The plastic coating provided on the gasket fills such irregularities. The marginal flanges about the surface openings when flattened down as described are placed under tension so that at all times they are inherently strongly urged against both the adjacent face of the block and the adjacent face of the head. The two-ply gasket sheet structure exhibits a compressibility and resilience which makes for a tight-fitting seal between the cylinder block and the head about the openings therein, and the manner in which the two plies are secured together provides for freedom of response of the complementary flange portions and adjacent areas to accomplish satisfactory sealing.

What I claim is:

1. A gasket formed of two complementary planar plies of thin flexible resistantly resilient sheet metal having registering service openings therethrough, each ply having a planar flange portion immediately adjacent to and surrounding certain of said service openings and bent up out of the plane of the ply at an obtuse angle with respect to such plane, said planar flange portions of the two plies surrounding said service openings being complementary and projecting in opposite directions away from the combined plane of the two plies and toward the said service openings, each of said flange portions being resistingly resilient and yieldable to be brought into back-to-back planar engagement with its complementary flange portion within the combined plane of the two plies, a heat resistant plastic coating covering the opposed surfaces of the two plies, said two plies being secured together back-to-back at spaced apart points in proximity only to the outer perimeter of the gasket spaced from the planar flange portions of the two plies, and said two plies being free from each other throughout the entire area that includes the service openings and the flange portions thereabout with the planar flange portions of one ply being free from the complementary flange portions of the other ply to move and respond independently thereof and without restraint by the other ply except as the same is restrained by said points of securement of the two plies together.

2. A gasket as defined in claim 1 characterized in that one of said plies opposite a service opening through the other ply, which said service opening is provided with one of the planar flange portions as specified in claim 1, extends continuously across such service opening in said other ply and is deformed outwardly away from said service opening and away from the flange extending thereabout.

References Cited in the file of this patent

UNITED STATES PATENTS

| | | |
|---|---|---|
| 1,866,160 | Griswold | July 5, 1932 |
| 2,156,662 | Wills | May 2, 1939 |
| 2,695,186 | Balfe | Nov. 23, 1954 |

FOREIGN PATENTS

| | | |
|---|---|---|
| 810,728 | France | Jan. 6, 1937 |